United States Patent Office 3,067,263
Patented Dec. 4, 1962

3,067,263
PREPARATION OF 3,3,3-TRIFLUOROPROPENE
John J. Newport III, Lake Jackson, Franciszek Olstowski, Jones Creek, and John D. Watson, Lake Jackson, Tex., assignors to The Dow Chemical Company, Midland, Mich., a corporation of Delaware
No Drawing. Filed Oct. 5, 1959, Ser. No. 844,197
6 Claims. (Cl. 260—653.3)

This invention relates to a method for preparing 3,3,3-trifluoropropene and more particularly is concerned with a non-catalytic single step process of preparing 3,3,3-trifluoropropene.

One of the conventional methods of preparing 3,3,3-trifluoropropene involves a multi-step process including the conversion of ethyl trifluoroacetate to trifluoroacetone, reducing the trifluoroacetone to the alcohol, and dehydrating the alcohol to 3,3,3-trifluoropropene. This process is expensive because of the starting materials and the numerous steps involved.

A second method involves the free radical addition of $CF_3I$ to $CH_2=CH_2$ in the presence of a catalyst and then dehydroiodination to yield 3,3,3,-trifluoropropene. This process, like the one outlined in the preceding paragraph, involves expensive reagents, catalysts and a multi-step procedure, and thus constitutes an expensive procedure for preparing 3,3,3-trifluoropropene.

Still another method involves reacting $CCl_4$ with HBr in the presence of a catalyst to produce $$CCl_3—CH_2—CH_2Br$$

and reacting the $CCl_3—CH_2—CH_2Br$ with hydrogen fluoride to yield 3,3,3-trifluoropropene.

It is an object of our invention to provide a new and improved process for preparing 3,3,3-trifluoropropene. Another object is to provide such a process which does not require a catalyst and which, therefore, avoids the expense and other undesirable features of catalytic processes. A preferred object is to provide a method for producing 3,3,3-trifluoropropene from cheaper starting materials and by a cheaper and more efficient method. Still other objects will appear hereinafter.

These objects are readily accomplished by contacting, at a temperature ranging from about 600° C. to about 1000° C., a fluorohalomethane with ethylene, and, separating 3,3,3-trifluoropropene from the reaction mixture.

The fluorohalomethanes to be employed in accordance with our invention are represented by the formula $CF_3X$, wherein X is a halogen, either chlorine or bromine. The hydrocarbon reactant will be ethylene.

The reactant ratio may be varied from 10:1 to 1:10 fluorohalomethane to hydrocarbon, with the preferred reactant ratio of 5:1 fluorohalomethane to hydrocarbon giving good conversions and yields.

The reactor will be heated to temperatures of from about 600° C. to about 1000° C. At temperatures materially below 600° C., the conversion is too low to be practicable and temperatures below 550° C. are generally inoperative.

Contact times, as expressed herein, are based on the time the reactant gases spend in that portion of the reactor that is within 100° C. of the temperature indicated for the operation. In our process, the contact times may be within the range of from about 0.1 second to about 10 seconds. Preferably, a contact time of 0.5 second is employed.

The process is preferably carried out at atmospheric pressures, that is, a pressure of approximately one atmosphere, however, higher and lower variations in the range of 0.5 to 5 atmospheres have little or no effect on the conversions and yields.

The products of the reaction passing from the reactor will usually be scrubbed in caustic solution in order to remove acidic products from the gaseous stream and the trifluoropropene recovered in a conventional manner.

The following examples are given to more clearly illustrate our invention but are not to be construed as limiting the invention thereto.

Example 1

The reactor consisted of a nickel tube having an inside diameter of ⅜ of an inch and a length of approximately 12 inches. The reactor was heated to a temperature of 700° C. by a one-half kilowatt tube furnace. Ethylene was passed through the tube at a flow rate of 11 grams per hour admixed with a $CF_3Br$ at a flow rate of 43 grams per hour. The estimated contact time of the reactants at the furnace temperature was approximately 0.5 second.

The exit gases from the reactor were passed through an aqueous caustic scrubber to trap any acidic products formed. The gases from the scrubber were then trapped in a gas bomb.

The product gases were then analyzed by infra-red techniques and found to contain 28 mole percent of $CF_3Br$, 25.3 mole percent of $CF_3H$, 24.4 mole percent of $CH_2=CH_2$, and 12.3 mole percent of $CF_3CH=CH_2$. Gas analysis indicated that the conversion per pass, based on $CF_3Br$, was approximately 50 percent and the yield of $CF_3CH=CH_2$ was approximately 33 percent per pass.

Since it is known that the side product, $CF_3H$, can be reacted with bromine to regenerate $CF_3Br$ almost quantitatively the ultimate yield of $CF_3CH=CH_2$ would then be of the order of 90 percent.

Example 2

The procedure as outlined in Example 1 was repeated except that a reaction temperature of 650° C. was employed.

On analysis the exit gases were found to contain 77 mole percent of $CF_3Br$, 11 mole percent $CF_3H$ and 12 mole percent $CF_3CH=CH_2$.

Thus, it can be seen that lowering the reaction temperature lowered the conversion but increased the yield of $CF_3CH=CH_2$ somewhat.

Example 3

The reactor consisted of a copper tube having an inside diameter of ⅓ inch and a length of 18 inches. The reactor was heated by a one-half kilowatt tube furnace to a temperature of 950° C.

Ethylene was passed through the reactor at a rate of 17.6 grams per hour in admixture with $CF_3Cl$ at a rate of 65 grams per hour. The contact time was approximately 0.5 second. The product gases were passed through a caustic scrubber and analyzed by infra-red techniques to contain 12.5 mole percent of $CF_3Cl$, 8 mole percent of $CF_3H$, 6 mole percent of $C_2H_4$, and 10 mole percent of $CF_3CH=CH_2$.

Various modifications may be made in the present invention without departing from the spirit and scope thereof and, we limit ourselves only as defined in the appended claims.

We claim:
1. A process for preparing 3,3,3-trifluoropropene which comprises contacting, at a temperature of from about 600° C. to about 1000° C., ethylene with a compound having the formula $CF_3X$, wherein X is a halogen selected from the group consisting of chlorine and bromine, and, separating 3,3,3-trifluoropropene from the reaction mixture.

2. A process for preparing 3,3,3-trifluoropropene which comprises contacting, at a temperature of about 700° C., ethylene and a compound having the formula $CF_3X$, wherein X is a halogen selected from the group consisting of chlorine and bromine, and separating 3,3,3-trifluoropropene from the reaction mixture.

3. A process for preparing 3,3,3-trifluoropropene which comprises contacting, at a temperature of from about 600° C. to about 1000° C., ethylene with $CF_3Br$, and, separating 3,3,3-trifluoropropene from the reaction mixture.

4. A process for preparing 3,3,3-trifluoropropene which comprises contacting, at a temperature of about 700° C., ethylene and $CF_3Br$, and separating 3,3,3-trifluoropropene from the reaction mixture.

5. A process for preparing 3,3,3-trifluoropropene which comprises contacting at a temperature of from about 600° C. to about 1000° C., ethylene with $CF_3Cl$, and separating 3,3,3-trifluoropropene from the reaction mixture.

6. A process for preparing 3,3,3-trifluoropropene which comprises contacting, at a temperature of 950° C., ethylene and $CF_3Cl$, and separating 3,3,3-trifluoropropene from the reaction mixture.

References Cited in the file of this patent

UNITED STATES PATENTS

| | | |
|---|---|---|
| 2,551,639 | Feasley et al. | May 8, 1951 |
| 2,579,437 | Miller | Dec. 18, 1951 |
| 2,603,663 | Feasley | July 15, 1952 |
| 2,979,539 | Errede et al. | Apr. 11, 1961 |

FOREIGN PATENTS

| | | |
|---|---|---|
| 1,158,447 | France | Jan. 20, 1958 |
| 576,707 | Canada | May 26, 1959 |